US009834138B2

(12) United States Patent
Asada et al.

(10) Patent No.: US 9,834,138 B2
(45) Date of Patent: Dec. 5, 2017

(54) LIGHTING DEVICE FOR VEHICLE

(71) Applicant: TOYOTA BOSHOKU KABUSHIKI KAISHA, Aichi-ken (JP)

(72) Inventors: Atsushi Asada, Aichi-ken (JP); Masanori Sekiya, Aichi-ken (JP); Naomi Omura, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 33 days.

(21) Appl. No.: 15/087,376

(22) Filed: Mar. 31, 2016

(65) Prior Publication Data
US 2016/0347244 A1 Dec. 1, 2016

(30) Foreign Application Priority Data

May 26, 2015 (JP) .................................. 2015-106361

(51) Int. Cl.
| *B60Q 3/02* | (2006.01) |
| *B60Q 3/64* | (2017.01) |
| *B60Q 3/217* | (2017.01) |
| *B60Q 3/78* | (2017.01) |
| *F21V 8/00* | (2006.01) |
| *B60Q 3/62* | (2017.01) |
| *G02B 6/42* | (2006.01) |

(52) U.S. Cl.
CPC .............. *B60Q 3/64* (2017.02); *B60Q 3/217* (2017.02); *B60Q 3/78* (2017.02); *B60Q 3/62* (2017.02); *G02B 6/0008* (2013.01); *G02B 6/4298* (2013.01)

(58) Field of Classification Search
CPC ... B60Q 3/62; B60Q 3/64; B60Q 3/66; B60Q 3/68; B60Q 3/78; B60Q 3/217; G02B 6/4298; G02B 6/0006; G02B 6/0008
See application file for complete search history.

(56) References Cited

U.S. PATENT DOCUMENTS

| 5,333,227 A | 7/1994 | Ishiharada et al. |
| 9,016,914 B2 | 4/2015 | Ukai et al. |

(Continued)

FOREIGN PATENT DOCUMENTS

| JP | 6-75120 | 3/1994 |
| JP | 2005-306233 | 11/2005 |
| JP | 2013-086534 | 5/2013 |

*Primary Examiner* — Y M. Lee
(74) *Attorney, Agent, or Firm* — Greenblum & Bernstein, P.L.C.

(57) ABSTRACT

A lighting device mounted on a vehicular interior part includes a light source having a light exit surface, an elongated light guide member having a light entrance surface opposite the light exit surface of the light source and through which light from the light source enters, and a light exit surface through which the light exits, the elongated light guide member including an elongated core member having an end surface that is the light entrance surface, and a cover member covering an outer peripheral surface of the elongated core member, and the lighting device further includes a positioning member positioning the light entrance surface of the elongated light guide member with respect to the light source, and including a contact portion that is in contact with an outer peripheral edge portion of the end surface of the elongated core member and is not in contact with the cover member.

14 Claims, 8 Drawing Sheets

(56) References Cited

U.S. PATENT DOCUMENTS

| | | | | |
|---|---|---|---|---|
| 2004/0246744 | A1* | 12/2004 | Krupa | G02B 6/0006 362/555 |
| 2006/0221626 | A1* | 10/2006 | Kamiya | B60Q 3/64 362/514 |
| 2007/0258228 | A1* | 11/2007 | Hein | G01D 11/28 362/23.18 |
| 2013/0094233 | A1 | 4/2013 | Ukai et al. | |

* cited by examiner

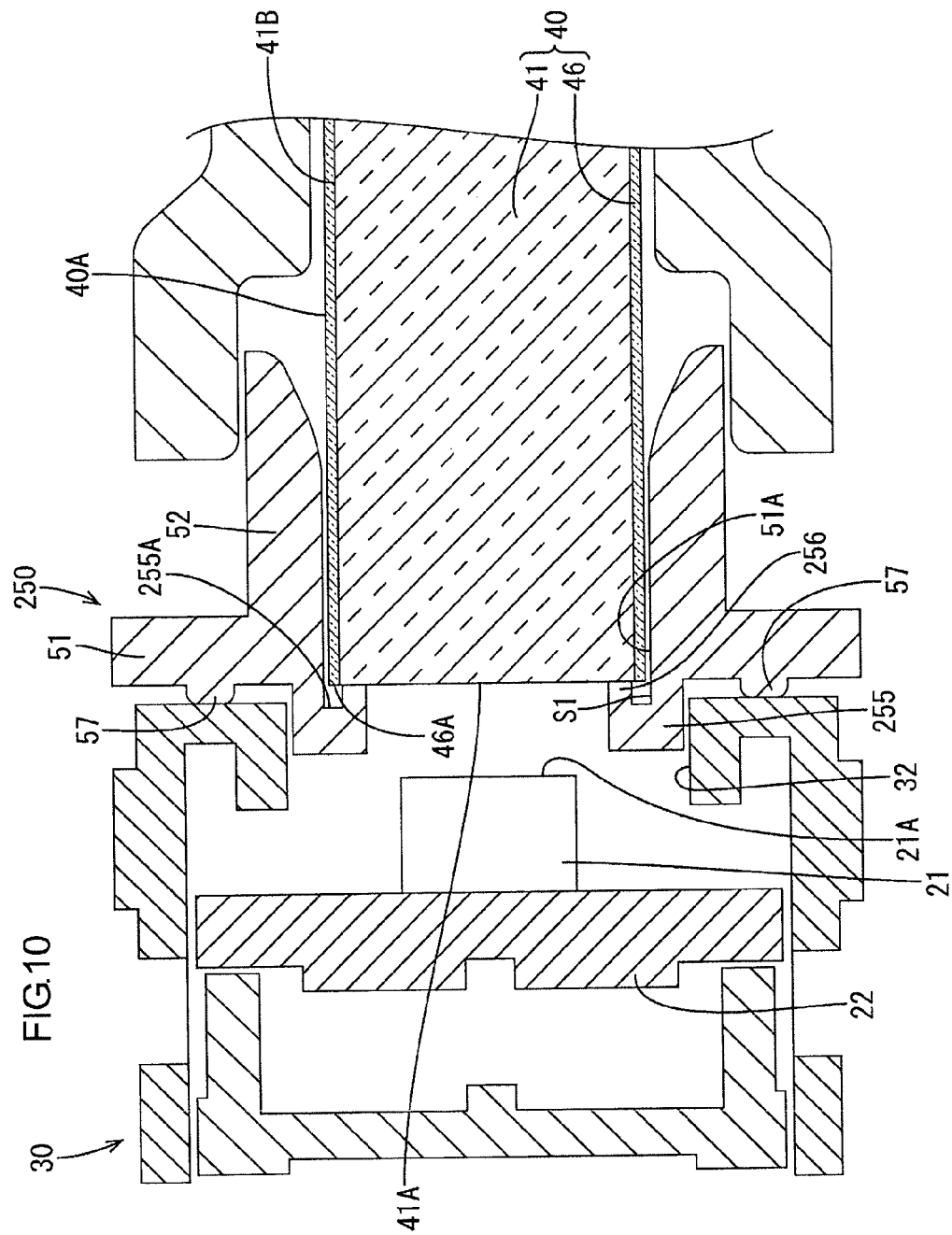

LIGHTING DEVICE FOR VEHICLE

CROSS REFERENCE TO RELATED APPLICATION

This application claims priority from Japanese Patent Application No. 2015-106361 filed on May 26, 2015. The entire contents of the priority application are incorporated herein by reference.

FIELD OF THE INVENTION

The present disclosure relates to a lighting device for a vehicle.

BACKGROUND OF THE INVENTION

There has been a lighting device that is provided in an interior part of a vehicle. The lighting device includes a light source (LED) and a light guide member that guides light from the light source to illuminate surroundings thereof. The light guide member includes an elongated core member made of acrylic resin and a cover member made of fluororesin. The elongated core member is covered with the cover member. The lighting device further includes a positioning member that positions an end portion of the light guide member with respect to the light source.

Usually, the cover member is fixed to the core member with pressure. Therefore, the cover member may be separated from the core member if an external force is applied to the cover member. If the cover member is separated from the core member, a space may be generated between the cover member and the core member and air may enter the space. This may cause unevenness in brightness of light from the light guide member.

SUMMARY OF THE INVENTION

The present invention has been made in view of the aforementioned circumstances. An objective of the present invention is to provide a lighting device including a light guide member where a cover member is less likely to be separated from a core member of the light guide member.

A technology described herein relates to a lighting device for vehicle mounted on a vehicular interior part including a light source having a light exit surface, an elongated light guide member having a light entrance surface opposite the light exit surface of the light source and through which light from the light source enters, and a light exit surface through which the light exits, the elongated light guide member including an elongated core member having an outer peripheral surface and an end surface that is the light entrance surface, the end surface having an outer peripheral edge portion, and a cover member covering an outer peripheral surface of the elongated core member, and the lighting device further including a positioning member positioning the light entrance surface of the elongated light guide member with respect to the light source, and including a contact portion that is in contact with the end surface of the elongated core member in the outer peripheral edge portion and is not in contact with the cover member.

BRIEF DESCRIPTION OF THE DRAWINGS

FIG. 10 is a cross-sectional view illustrating a lighting device according to another embodiment.

DETAILED DESCRIPTION OF EMBODIMENTS

First Embodiment

Figure 1:
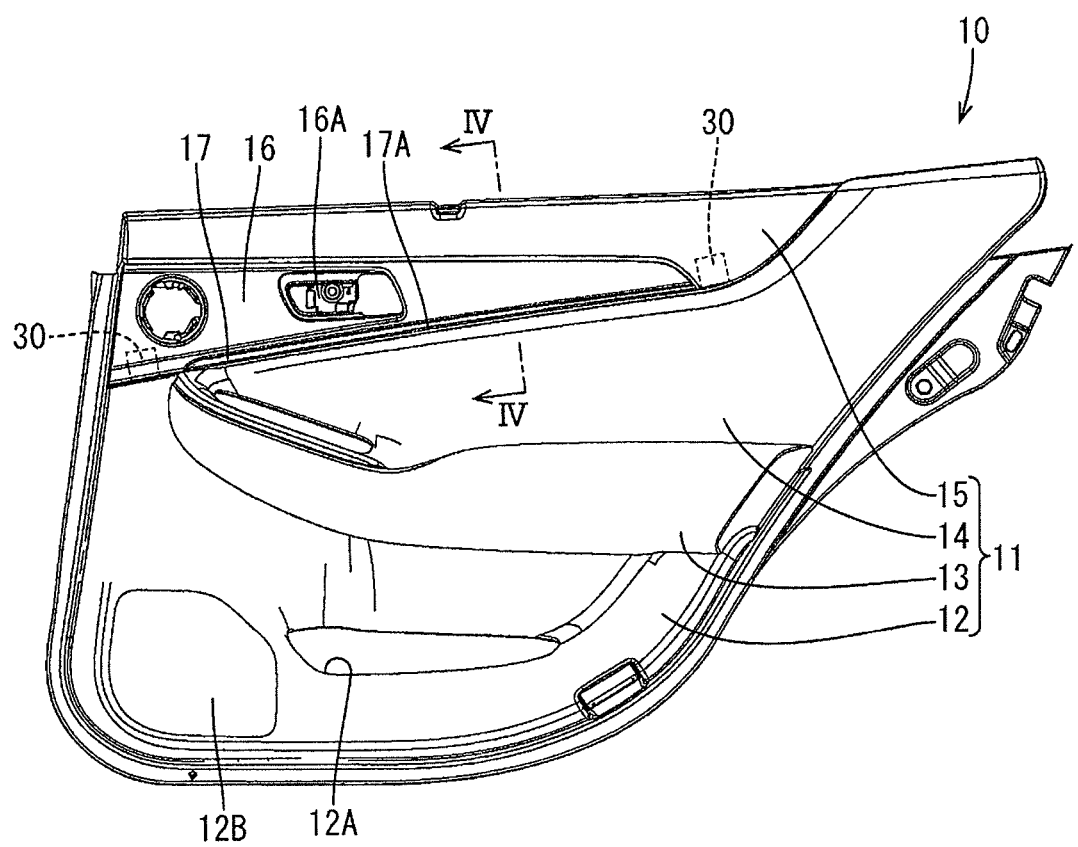
FIG. 1 is a front view of a door trim having a lighting device according to a first embodiment.

One embodiment will be described with reference to FIGS. 1 to 7. A door trim 10 is mounted on a door inner panel (not illustrated) and the door trim 10 and the door inner panel configure a vehicular door. As illustrated in FIG. 1, the door trim 10 includes a trim main body 11.

Figure 2:
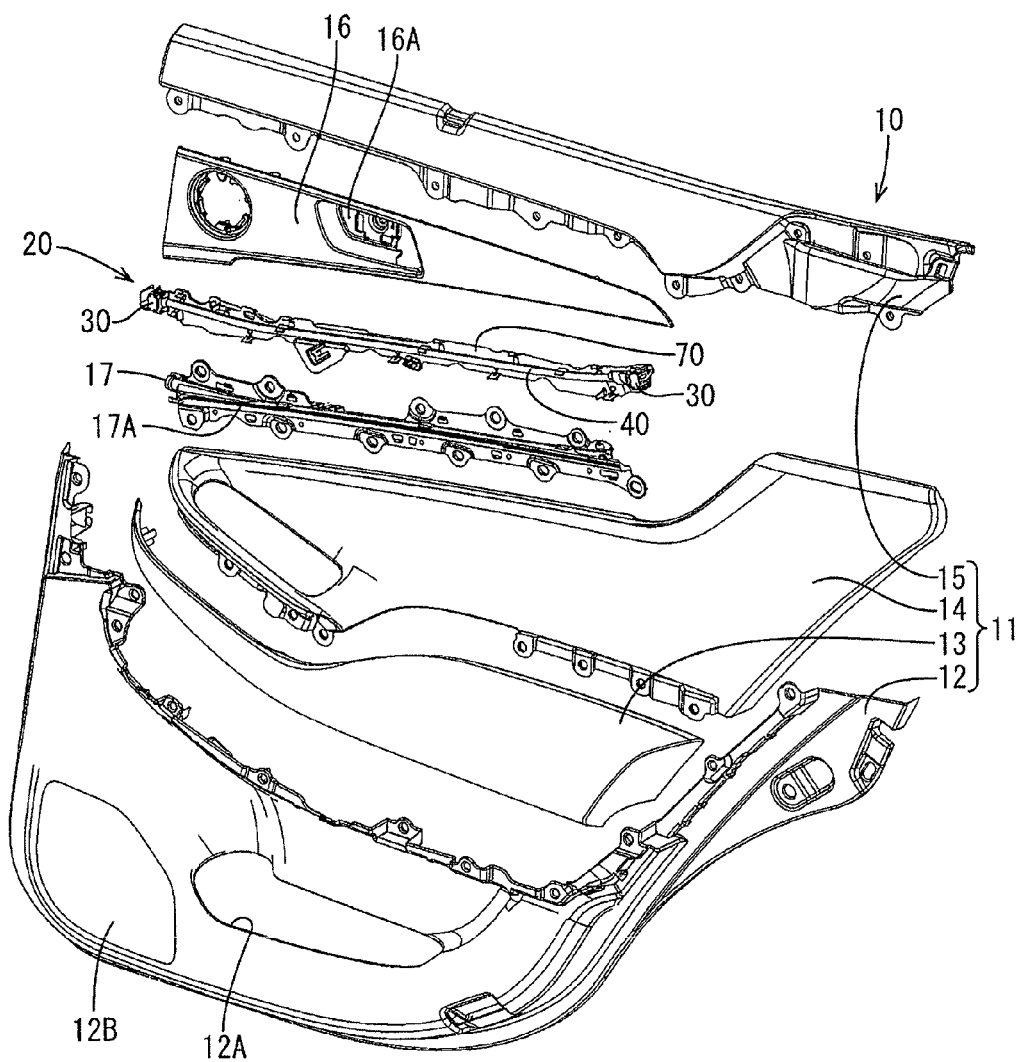
FIG. 2 is an exploded perspective view illustrating the door trim in FIG. 1.

As illustrated in FIG. 2, the trim main body 11 includes a lower board 12, an armrest 13, an ornament 14, and an upper board 15. The lower board 12, the armrest 13, the ornament 14, and the upper board 15 are board members that are made of synthetic resin such as polypropylene. Each board member of the trim main body 11 is not necessarily made of synthetic resin but may be made of mixture of woody material and synthetic resin.

The lower board 12 constitutes a lower portion of the trim main body 11. The lower board 12 includes a door pocket opening 12A of a door pocket and a speaker grill 12B. The armrest 13 has an elongated shape extending in a vehicular front-rear direction and projects toward a vehicular interior side. The ornament 14 has an elongated shape extending in the vehicular front-rear direction and has a vehicular interior side surface being inclined toward the vehicular interior side as is closer to a vehicular rear side. The ornament 14 includes a vehicular rear portion that constitutes an upper edge portion of the trim main body 11.

The upper board 15 has an elongated shape extending in the vehicular front-rear direction and mainly constitutes the upper edge portion of the trim main body 11. The board members 12, 13, 14, 15 included in the trim main body 11 are connected to each other with connecting means using mounting bosses and mounting pieces (thermal caulking or screws).

A first decoration member 16 and a second decoration member 17 are disposed between the lower edge portion of the upper board 15 and the upper edge portion of the ornament 14. The first decoration member 16 and the second decoration member 17 are elongated in the vehicular front-rear direction. The first decoration member 16 is arranged on an upper side with respect to the second decoration member 17. An upper edge portion of the first decoration member 16 is connected to the lower edge portion of the upper board 15 and a lower edge portion thereof is connected to the upper edge portion of the second decoration member 17. A lower edge portion of the second decoration member 17 is connected to the ornament 14. The first decoration member 16 and the second decoration member 17 are mounted on other components with fixing means using mounting bosses and mounting pieces (thermal caulking or screws).

The first decoration member 16 includes an inside handle mount portion 16A where an inside handle (not illustrated) is mounted. The second decoration member 17 (a vehicular interior part) includes a light exit portion 17A, which will be described later. Light (described with an arrow L1 in FIG. 4) from a lighting device 20 that is disposed on a rear side (a vehicular exterior side) is exited through the light exit portion 17A toward the vehicular interior side. Light from the lighting device 20 is exited through the light exit portion 17A so that design of the door trim 10 is improved.

Figure 3:
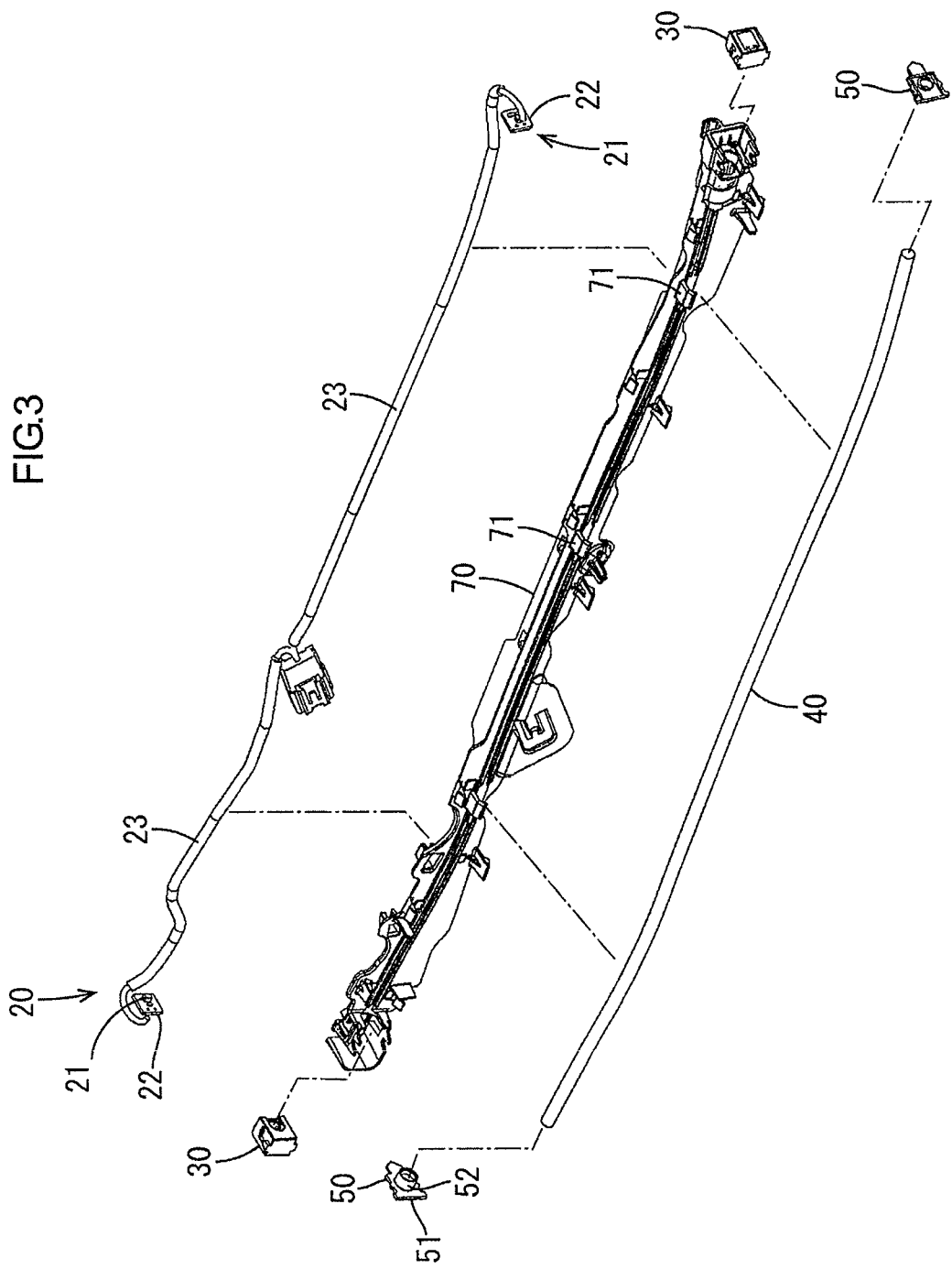
FIG. 3 is an exploded perspective view illustrating the lighting device according to the first embodiment.

Next, a configuration of the lighting device 20 will be described. As illustrated in FIG. 3, the lighting device 20 includes LEDs 21, housing members 30, the light guide member 40, positioning members 50, and a base member 70. The LEDs 21 are arranged in the respective housing members 30. The positioning members 50 are disposed on the respective ends of the light guide member 40. The base member 70 is elongated in the vehicular front-rear direction. The housing members 30, the positioning members 50, and the light guide member 40 are mounted on the base member 70 to constitute a unit, and the base member 70 including the housing members 30, the positioning members 50, and the light guide member 40 is mounted on the second decoration member 17 to constitute the lighting device 20.

Figure 4:
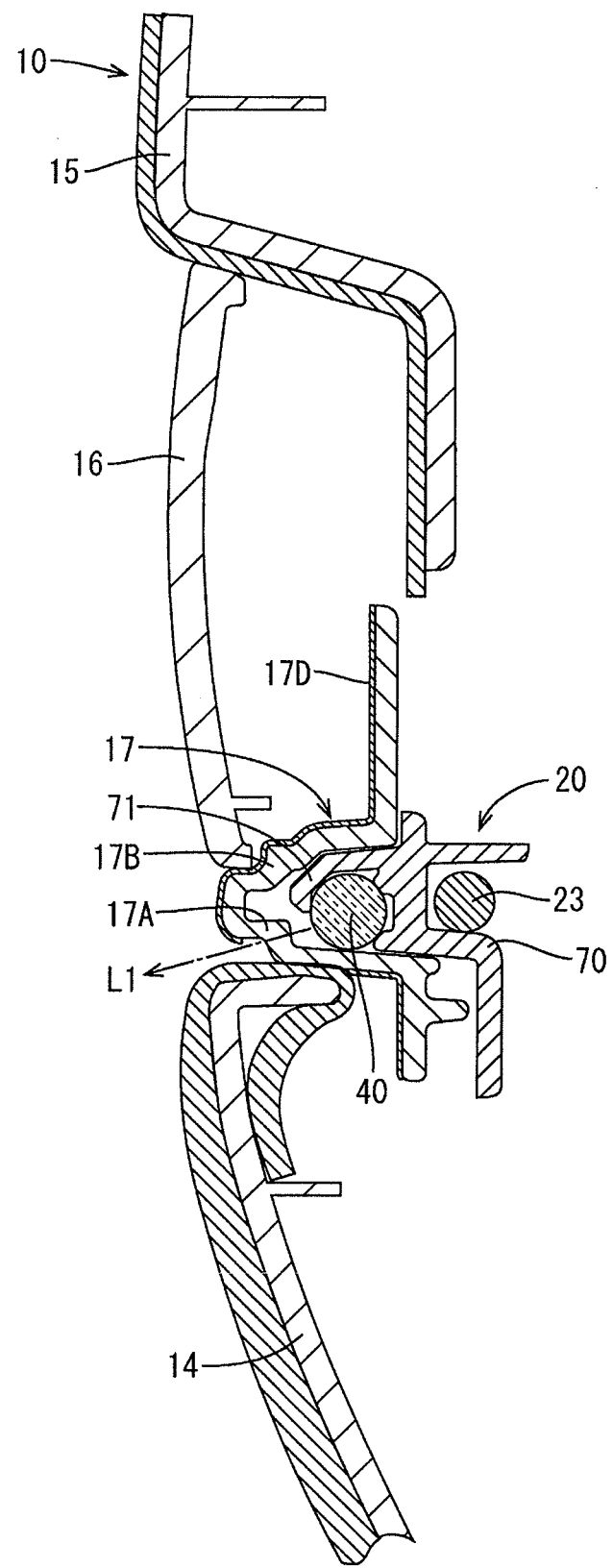
FIG. 4 is a cross-sectional view illustrating the lighting device taken along line IV-IV in FIG. 1.
Figure 7:
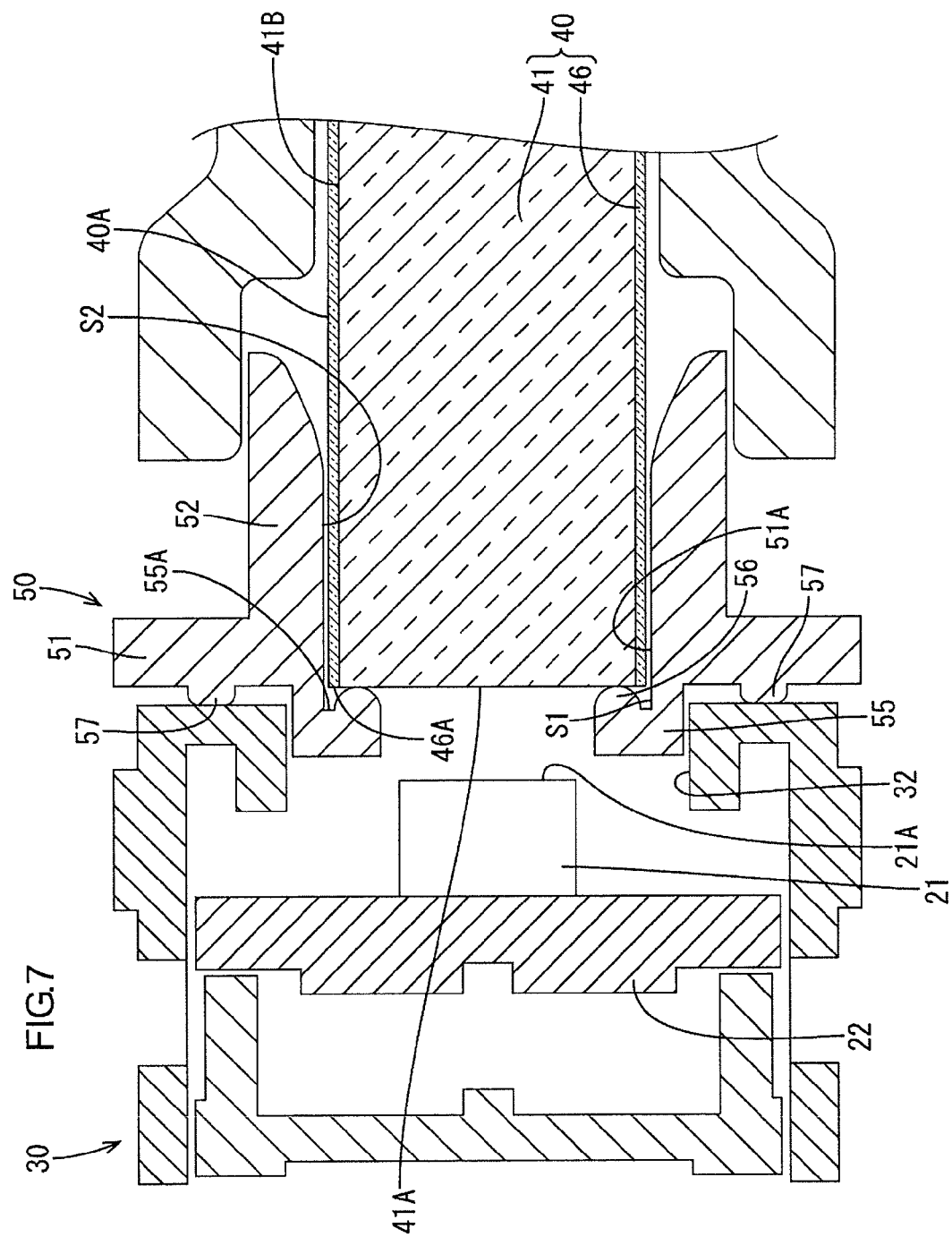
FIG. 7 is a cross-sectional view illustrating the light device taken along line VII-VII in FIG. 5.

As illustrated in FIG. 7, the LED 21 (the light source) is mounted on an LED board 22 and connected to a power supply device (not illustrated) via an electric line 23 (see FIG. 3). An example of the power supply device is a battery mounted in a vehicle. The electric line 23 is disposed along a vehicular exterior side surface of the base member 70, as illustrated in FIG. 4. The housing members 30 are made of synthetic resin, for example, and have a box shape having a through hole 32 open to the light guide member 40. Light from the LED 21 is exited from the housing member 30 through the through hole 32 outside the housing member 30.

The light guide member 40 has flexibility and light transmission. The light guide member 40 includes a core member 41 (a core) made of acrylic resin and a cover member 46 (clad) made of fluororesin. The core member 41 has a circular cross section and an elongated shape (bar shape) extending in the vehicular front-rear direction. The cover member 46 has a length same as that of the core member 41 and an entire area of an outer peripheral surface 41B (a side surface) of the core member 41 is covered with the cover member 46. The cover member 46 is fixed to the core member 41 with fixing means such as fixing with pressure. Known light guide members disclosed in Japanese Unexamined Published Application Nos. 2005-306233 and 6-75120 can be used as the light guide member 40 of the present embodiment.

The LEDs 21 are disposed on the respective end portions of the core member 41 and light exit surfaces 21A of the LEDs 21 are opposed to end surfaces 41A of the core member 41, respectively. The end surface 41A of the core member 41 is a light entrance surface of the light guide member 40. According to such a configuration, light from the LEDs 21 enters the core member 41 through the respective end surfaces 41A and totally reflects repeatedly within the light guide member 41 to be guided through the light guide member 41. Thereafter, the light is exited from the light guide member 40 through entire surface area of the outer peripheral surface 40A of the light guide member 40 (a side surface, a light exit surface of the light guide member).

As illustrated in FIG. 4, the second decoration member 17 includes a base member 17B and a light blocking layer 17D. The base member 17B is made of a synthetic resin material having high light transmission or high transparency such as acrylic or polycarbonate. A vehicular interior side surface of the base member 17B is covered with the light blocking layer 17D. No light blocking layer 17D is disposed on a part of the base member 17B corresponding to a vehicular interior side surface of the light guide member 40 and the part of the base member 17B is a light exit portion 17A through which light L1 from the light guide member 40 is transmitted toward a vehicular interior side.

The light blocking layer 17D is formed by coating the surface of the base member 17B with a material having a light blocking property or adhering a film having a light blocking property to the surface of the base member 17B. The light blocking layer 17D may be formed by coating with plating and this improves design. However, examples of the light blocking layer 17D are not limited thereto and the light blocking layer 17D may be formed with any other methods as long as it has a light blocking property. The base member 17B contains particles that disperse light (for example, particles exhibiting milky white color). Namely, the light is transmitted through the base member 17B with being dispersed by the base member 17B.

Figure 5:
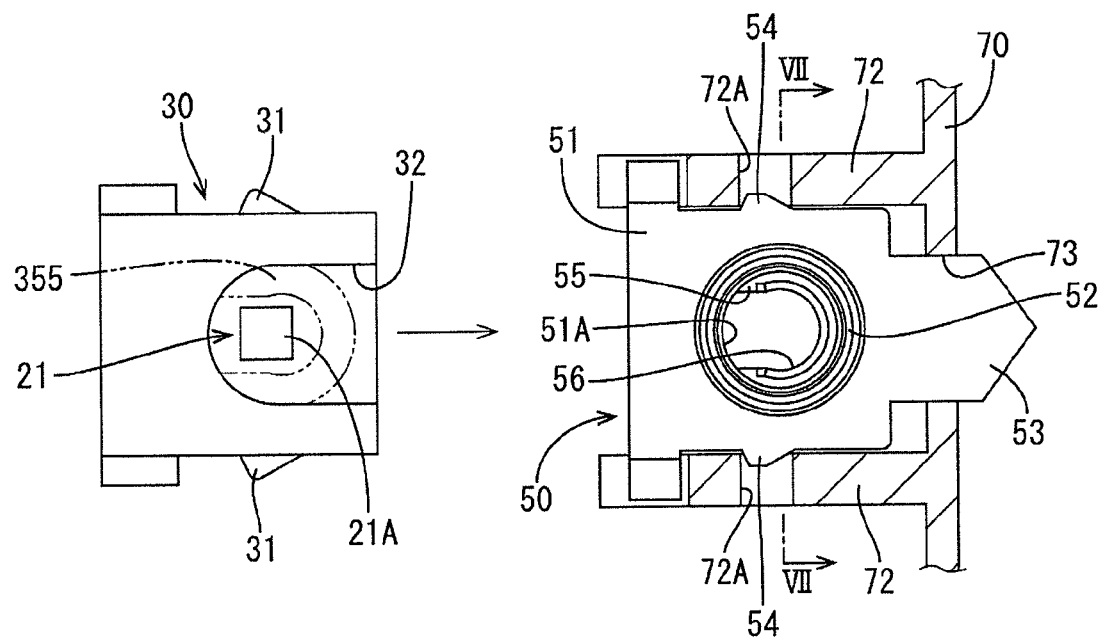
FIG. 5 is a view illustrating a housing member, a positioning member, and a base member.
Figure 6:
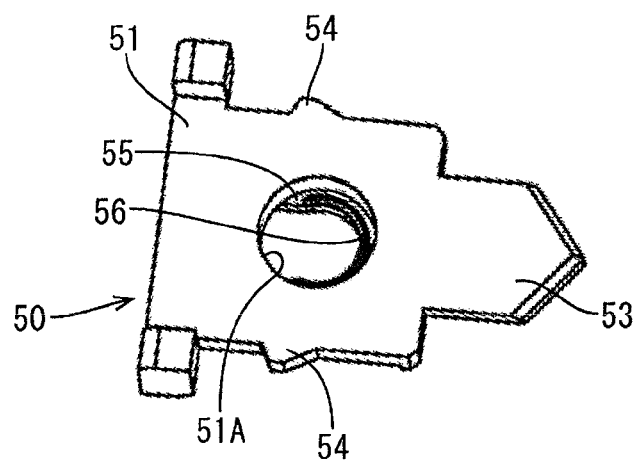
FIG. 6 is a perspective view illustrating the positioning member.

As illustrated in FIG. 4, the light guide member 40 is held by stoppers 71 included in the base member 70. The end surface 41 of the light guide member is positioned by the positioning member 50 with respect to the LED 21 as illustrated in FIG. 7. The positioning member 50 is made of synthetic resin and includes a plate portion 51 that is a substantially rectangular plate and a cylindrical portion 52 having a cylindrical shape, as illustrated in FIGS. 6 and 7. The cylindrical portion 52 is not illustrated in FIG. 6. As illustrated in FIG. 5, the base member 70 includes two mount ribs 72 that are opposite each other. The positioning member 50 and the housing member 30 are inserted in a space between the mount ribs 72 from the vehicular interior side and arranged therein. Accordingly, the positioning member 50 and the housing member 30 are mounted on the base member 70. The base member includes an insertion through hole 73 and each of the mount ribs 72 includes an insertion through hole 72A.

The plate portion 51 includes an insertion piece 53 and two projections 54 on a peripheral edge thereof. The insertion piece 53 is inserted in the insertion through hole 73 included in the base member 70, and the projections 54 are inserted in the respective insertion through holes 72A included in the mount ribs 72. As illustrated in FIG. 5, the housing member 30 includes two projections 31 on an outer peripheral surface thereof. The projection 31 and the projection 54 of the plate portion 51 are inserted together through the corresponding insertion through hole 72A.

As illustrated in FIG. 6, the plate portion 51 includes a circular through hole 51A. As illustrated in FIGS. 5 and 7, the cylindrical portion 52 projects from a hole edge of the through hole 51A to be away from the LED 21. As illustrated in FIG. 7, the cylindrical portion 52 has an inner diameter that is equal to a diameter of the through hole 51A and the cylindrical portion 52 has an inner space S2 that is communicated with the through hole 51A.

Each of the inner diameter of the cylindrical portion 52 and the diameter of the through hole 51A is slightly greater than a diameter of the light guide member 40. Accordingly, the light guide member 40 is inserted in an inner space of the cylindrical portion 52 and the through hole 51A so that an end portion of the light guide member 40 is held by the cylindrical portion 52. The cylindrical portion 52 has a distal end portion that has an inner diameter greater than a basal portion thereof and the cylindrical portion 52 has a wall thickness being decreased as is closer to the distal end portion. According to such a configuration, the light guide member 40 is easily inserted in the cylindrical portion 52 and the end portion of the light guide member 40 is arranged in the inner space S2 of the cylindrical portion 52.

As illustrated in FIG. 7, the positioning member 50 includes the plate member 51, the cylindrical portion 52, and a positioning portion 55. The positioning portion 55 is disposed closer to the LED 21 than the end surface 41A of the light guide member 40 and extends from the hole edge portion of the through hole 51A of the plate member 51 toward the LED 21. Thus, the plate portion 51, the cylindrical portion 52, and the positioning portion 55 are integrally provided as a unitary component. The positioning portion 55 includes a contact portion 56 that is in contact with the end surface 41A of the light guide member 40. Specifically, the contact portion 56 is in contact with the end surface 41A of the core member 41. As illustrated in FIG. 7, the positioning portion 55 extends from the hole edge portion of the through hole 51A of the plate portion 51 toward the LED 21, and further extends toward a center of the through hole 51A and further extends toward the end surface 41A. The positioning portion 55 includes the contact portion 56 at an extended end thereof. The positioning portion 55 is disposed on the hole edge portion of the through hole 51A and on an opposite side from the cylindrical portion 52 with respect to the plate portion 51. The positioning portion 55 has a substantially U-shaped cross section cut along an axis of the cylindrical portion 52.

The contact portion 56 projects toward the end surface 41A of the light guide member 40, and the thickness (a length in up-down direction in FIG. 7) of the contact portion 56 is decreased as is closer to the end surface 41A of the light guide plate 40 or closer to the extended end thereof. The contact portion 56 has a semi-spherical cross-sectional shape taken along the axis of the cylindrical portion 52 as is in FIG. 7. The contact portion 56 is in contact with only an outer peripheral edge portion of the end surface 41A at the extended end of the contact portion 56. Namely, the contact portion 56 is not in contact with the cover member 46 on an end surface 41A side. The contact portion 56 is in contact with the end surface 41A that is opposite the LED 21 and accordingly, the end surface 41A is less likely to be moved closer to the LED 21 even if the core member 41 is deformed and the gap between the end surface 41A and the light exit surface 21A is surely defined and maintained.

The positioning portion 55 including the contact portion 56 has a substantially U-shape that is open toward the vehicular interior side (the left side in FIG. 5) in a view from the light guide member 40 side (see FIG. 5). The positioning portion 55 is fitted in the through hole 32 of the housing member 30. In FIG. 5, the positioning portion 55 that is fitted in the through hole 32 is described with an alternate long and two short dashed lines and provided with 355. The positioning portion 55 (a U-shaped projection) is fitted in the through hole 32 so that light from the LED 21 is less likely to leak from a gap between the housing member 30 and the positioning member 50 (see FIG. 7). The positioning portion 55 has an opposite surface 55A that faces at least an end surface 46A of the cover member 46 (and may faces the end surface 41A of the light guide member 40) is spaced from the end surface 46A of the cover member 46 (the end surface 41A). A certain clearance S1 is provided between the opposite surface 55A of the positioning portion 55 and at least the end surface 46A of the cover member 46 (the end surface 41A).

In this embodiment, as illustrated in FIG. 5, the positioning member 50 including the light guide member 40, which is not illustrated in FIG. 5, is mounted on the base member 70, and then the housing member 30 (the LED 21) is mounted on the base member 70 from the vehicular interior side (left side in FIG. 5). Namely, each of the light guide member 40 and the LED 21 can be mounted on the base member 70 independently and this may increase workability. As is described before, the positioning portion 55 and the contact portion 56 have a U-shape that is open toward the vehicular interior side. According to such a configuration, the positioning portion 55 and the contact portion 56 are less likely to be in contact with the housing member 30 (or the LED 21) when the housing member 30 is mounted on the base member 70.

As illustrated in FIG. 7, the plate portion 51 includes a projection 57 on a surface thereof facing the LED 21. The projection 57 is in contact with the housing member 30 and accordingly, the positioning member 50 is accurately positioned with respect to the housing member 30. The projection 57 has a semispherical cross-sectional shape and is in contact with the housing member 30 at a distal end portion thereof. According to such a configuration, the distal end portion of the projection 57 may be slightly deformed to absorb dimension error if a size of the projection 57 is greater than a correct one due to dimension error.

Next, effects of the present embodiment will be described. The lighting device 20 of the present embodiment is mounted on the second decoration member 17 of the door trim 10 and includes the LED 21, the elongated light guide member 40, and the positioning member 50. The elongated light guide member 40 includes the end surface 41A opposite the light exit surface 21A of the LED 21, and the outer peripheral surface 40A through which light entering through the end surface 41A is exited. The end surface 41A of the light guide member 40 is positioned with respect to the LED 21 by the positioning member 50. The light guide member 40 includes the elongated core member 41 having the end surface 41A, and the cover member 46 with which the outer peripheral surface 41B of the core member 41 is covered. The cover member 46 has the end surface 46A that is continuous to the end surface 41A. The positioning member 50 includes the positioning portion 55 including the contact portion 56 that is in contact with the end surface 41A of the core member 41 in the outer peripheral edge portion of the end surface 41A. The contact portion 56 is not in contact with the cover member 46 on the end surface 41A side. Namely, the contact portion 56 is not in contact with the end surface 46A of the cover member 46.

According to the present embodiment, the contact portion 56 is in contact with the end surface 41A (the light entrance surface) of the core member 41 so that a distance between the end surface 41A and the light emission surface 21A is defined. The contact portion 56 is not in contact with the cover member 46 on the end surface 41A side and only in contact with the core member 41. Therefore, an external force is less likely to act on the cover member 46 via the contact portion 56 and the cover member 46 is less likely to be separated from the core member 41.

The cover member 46 is likely to be separated from the core member 41 if the material of the core member 41 is different from that of the cover member 46 and the vehicle interior temperature changes. If coefficient of thermal expansion of the core member 41 with respect to the elongated direction thereof is higher than that of the cover member 46 with respect to the elongated direction thereof and the vehicle interior temperature is lower than the normal temperature (the length of the core member 41 is same as that of the cover member 46), the core member 41 is shrunk with a greater degree than the cover member 46. Therefore, the entire length of the core member 41 is smaller than the entire length of the cover member 46. Accordingly, the end portion 46A of the cover member 46 is outside the end portion of the core member 41 in a longitudinal direction thereof. If the contact portion is in contact with the end portion (the end surface) of the cover member, an external force acts on the cover member and the cover member may be separated from the core or damaged.

According to this embodiment, as illustrated in FIG. 7, the contact portion 56 is only in contact with the core member 41. Therefore, an external force is less likely to act on the cover member 46 and the separation of the cover member 46 from the core member 41 is less likely to occur. In the above description, the core member 41 has coefficient of thermal expansion higher than that of the cover member 46. However, it is not limited thereto.

The core member 41 and the cover member 46 may be made of same material (having same coefficient of thermal expansion), or the cover member 46 may have coefficient of thermal expansion higher than that of the core member 41. As long as an external force is less likely to act on the cover member 46, the separation of the cover member 46 is less likely to occur regardless of the change of vehicle interior temperature. With such a configuration, the separation of the cover member 46 is less likely to occur if the end portion of the cover member 46 is outside the end portion of the core member 41 due to a slight dimension error caused in a manufacturing process, for example.

In the present embodiment, the certain clearance S1 is provided between the opposite surface 55A of the positioning portion 55 and at least the end surface 46A, and may be provided between the opposite surface 55A and the end surface 41A. According to such a configuration, the cover member 46 is less likely to be in contact with the opposite surface 55A of the positioning portion 55 even if the vehicle interior temperature rises and the entire length of the cover member 46 is increased.

The positioning member 50 includes the through hole 51A where the end portion of the light guide member 40 having the end surface 41A (the light entrance surface) is inserted and the contact portion 56 extends along the hole edge of the through hole 51A. According to such a configuration, the end portion of the light guide member 40 is arranged in the through hole 51A and held by the cylindrical portion 52.

The contact portion 56 of the positioning portion 55 is only in contact with the end surface 41A of the core member 41 of the light guide member 40 and not in contact with the cover member 46 on the end surface 41A side. Namely, the contact portion 56 is not in contact with the end surface 46A of the cover member 46. The positioning portion 55 includes a portion extending toward the end surface 41A and the portion includes the contact portion 56. The contact portion 56 has thickness that is reduced as is closer to the end surface 41A.

According to such a configuration, a contact area between the end surface 41A of the core member 41 and the contact portion 56 is reduced. This reduces an area of a portion of the end surface 41A covered with the contact portion 56 and a greater amount of light from the LED 21 is incident on the end surface 41A.

Second Embodiment

Figure 8:
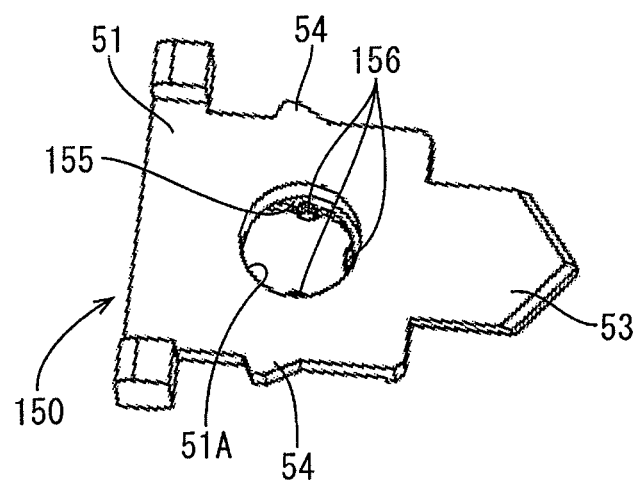
FIG. 8 is a perspective view illustrating a positioning member according to a second embodiment.
Figure 9:
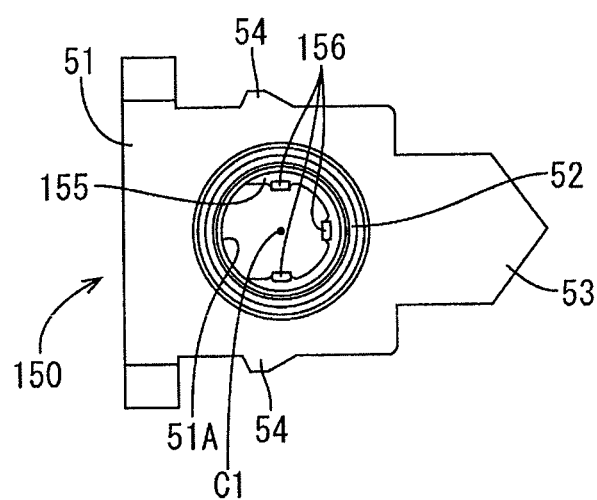
FIG. 9 is a front view illustrating the positioning member in FIG. 8.

Next, a second embodiment according to the present technology will be described with reference to FIGS. 8 and 9. Components same as those in the above embodiment will be provided with the same symbols or numerals and will not be described. In the present embodiment, a positioning member 150 has a configuration different from that of the above embodiment. As illustrated in FIGS. 8 and 9, the positioning member 150 includes a positioning portion 155 including contact portions 156 (three in FIG. 9) that are arranged along periphery of a hole edge portion of a circular through hole 51A (along an outer peripheral edge portion of the end surface 41A of the light guide member 40). The cylindrical portion 52 of the positioning member 150 is not described in FIG. 8.

As illustrated in FIG. 9, the three contact portions 156 are included in a positioning portion 155 having a U-shape and are arranged at intervals of 90 degrees around center C1 of the through hole 51A. The contact portions 156 are arranged on an upper side, a lower side, and a vehicular exterior side (a right side in FIG. 9), respectively, with respect to the center C1. With a configuration of the present embodiment that the contact portions 156 are arranged at intervals along the outer peripheral edge portion of the end surface 41A, an area of a light entrance surface (the end surface 41A) is increased compared to the configuration that the contact portion extends over entire periphery of the outer peripheral edge portion of the end surface 41A.

Other Embodiments

The present invention is not limited to the embodiments as described above with reference to the drawings. For example, the present invention may include following embodiments.

(1) In the above embodiments, the second decoration member 17 of the door trim 10 is an example of a vehicular interior part where the lighting device 20 is mounted. However, it is not limited thereto. For example, a quarter trim or a deck side trim may be an example of the vehicular interior part. A component where the lighting device 20 is mounted is not necessarily the second decoration member 17 but may be altered if necessary.

(2) In the above embodiments, the core member 41 is made of acrylic resin and the cover member 46 is made of fluororesin. However, the materials of the core member 41 and the cover member 46 are not limited thereto.

(3) In the first embodiment, the contact portion 56 has a U-shape that opens toward the vehicular interior side. However, it is not limited thereto. The housing member 30 and the positioning member 50 may be constituted as a unitary component, and the contact portion 56 may have a ring shape extending along an entire periphery of the through hole 51A.

(4) The cross-sectional shape of the contact portion is not necessarily a semispherical shape. For example, as illustrated in FIG. 10, a positioning portion 255 may have a contact portion 256 and the contact portion 256 may have a planar contact surface that is in contact with the end surface 41A of the core member 41. The positioning portion 255 may have an opposite surface 255A and the opposite surface 255A may face the end surface 41A and may be spaced from at least the end surface 46A having a certain clearance S1 therebetween.

(5) The light guide member 40 does not necessarily have a round bar shape. For example, the light guide member 40 may have a prism shape.

(6) In the above embodiments, the LEDs 21 are arranged on the respective two end portions of the light guide member 40 with respect to the elongated direction. However, it is not limited thereto. For example, an LED 21 may be arranged only one end portion of the light guide member 40 with respect to the elongated direction.

What is claimed is:

1. A lighting device for vehicle mounted on a vehicular interior part comprising:
    a light source having a light exit surface;
    an elongated light guide member having a light entrance surface opposite the light exit surface of the light source and through which light from the light source enters, and a light exit surface through which the light exits, the elongated light guide member including:
        an elongated core member having an outer peripheral surface and an end surface that is the light entrance surface, the end surface having an outer peripheral edge portion, and
        a cover member covering the outer peripheral surface of the elongated core member; and
    a positioning member positioning the light entrance surface of the elongated light guide member with respect to the light source, the positioning member including a contact portion that is in contact with the end surface of the elongated core member in the outer peripheral edge portion and is not in contact with the cover member, wherein
    the positioning member includes a through hole where an end portion of the elongated light guide member including the light entrance surface is inserted, and
    the positioning member includes the contact portion on a hole edge portion of the through hole.

2. The lighting device for vehicle according to claim 1, wherein the contact portion has a thickness that is gradually reduced as the contact portion extends toward the end surface of the core member.

3. The lighting device for vehicle according to claim 1, wherein the contact portion includes contact portions that are arranged along the outer peripheral edge portion of the end surface.

4. The lighting device for vehicle according to claim 1, wherein
    the positioning member includes a positioning portion including the contact portion, the positioning member includes the positioning portion on the hole edge portion, and
    the positioning portion is on a light source side with respect to the end surface of the elongated core member.

5. The lighting device for vehicle according to claim 1, wherein
    the contact portion is disposed on a light source side with respect to the end surface of the elongated core member.

6. The lighting device for vehicle according to claim 5, wherein
    the cover member has an end surface that is continuous to the end surface of the elongated core member, and
    the contact portion is not in contact with the end surface of the cover member.

7. The lighting device for vehicle according to claim 6, wherein the positioning portion has an opposite surface opposite at least the end surface of the cover member and the opposite surface is spaced from the end surface of the cover member.

8. A lighting device for vehicle mounted on a vehicular interior part comprising:
    a light source having a light exit surface;
    an elongated light guide member having a light entrance surface opposite the light exit surface of the light source and through which light from the light source enters, and a light exit surface through which the light exits, the elongated light guide member including:
        an elongated core member having an outer peripheral surface and an end surface that is the light entrance surface, the end surface having an outer peripheral edge portion, and
        a cover member covering the outer peripheral surface of the elongated core member; and
    a positioning member positioning the light entrance surface of the elongated light guide member with respect to the light source, the positioning member including a contact portion that is in contact with the end surface of the elongated core member in the outer peripheral edge portion and is not in contact with the cover member, wherein
    the positioning member includes a plate portion, a cylindrical portion, and a positioning portion,
    the plate portion has a through hole having a hole edge portion,
    the cylindrical portion extends from the hole edge portion to be away from the light source, an end portion of the elongated light guide member including the light entrance surface is inserted in the cylindrical portion, and
    the positioning portion includes the contact portion and is disposed on the hole edge portion of the through hole and on an opposite side from the cylindrical portion with respect to the plate portion.

9. The lighting device for vehicle according to claim 8, wherein
    the contact portion is disposed on a light source side with respect to the end surface of the elongated core member.

10. The lighting device for vehicle according to claim 9, wherein
    the cover member has an end surface that is continuous to the end surface of the elongated core member, and
    the contact portion is not in contact with the end surface of the cover member.

11. The lighting device for vehicle according to claim 10, wherein
    the positioning portion has an opposite surface opposite at least the end surface of the cover member and the opposite surface is spaced from the end surface of the cover member.

12. A lighting device for vehicle mounted on a vehicular interior part comprising:
    a light source having a light exit surface;
    an elongated light guide member having a light entrance surface opposite the light exit surface of the light source and through which light from the light source enters, and a light exit surface through which the light exits, the elongated light guide member including:
        an elongated core member having an outer peripheral surface and an end surface that is the light entrance surface, the end surface having an outer peripheral edge portion, and a cover member covering the outer peripheral surface of the elongated core member; and a positioning member positioning the light entrance surface of the elongated light guide member with respect to the light source, the positioning member including a contact portion that is in contact with the end surface of the elongated core member in the outer peripheral edge portion and is not in contact with the cover member, wherein the positioning member includes a plate portion and a positioning portion, the plate portion has a through hole having a hole edge portion and where an end portion of the elongated light guide member including the light entrance surface is inserted, the positioning portion includes the contact portion and is disposed on the hole edge portion of the through hole, and the positioning portion extends from the hole edge portion of the plate portion toward the light source, further extends toward a center of the through hole, and further extends toward the end surface of the elongated core member and has an extended end as the contact portion.

13. The lighting device for vehicle according to claim 12, wherein the contact portion has a U-shape along the hole edge portion extending at least a half of an entire periphery of the hole edge portion.

14. The lighting device for vehicle according to claim 12, wherein the positioning portion includes a portion extending toward the center of the through hole and the portion has an opposite surface opposite at least the end surface of the cover member, and the opposite surface is spaced from the end surface of the cover member.

* * * * *